Oct. 14, 1930.  R. C. HAISS  1,778,526
CONVEYER
Filed Aug. 31, 1927
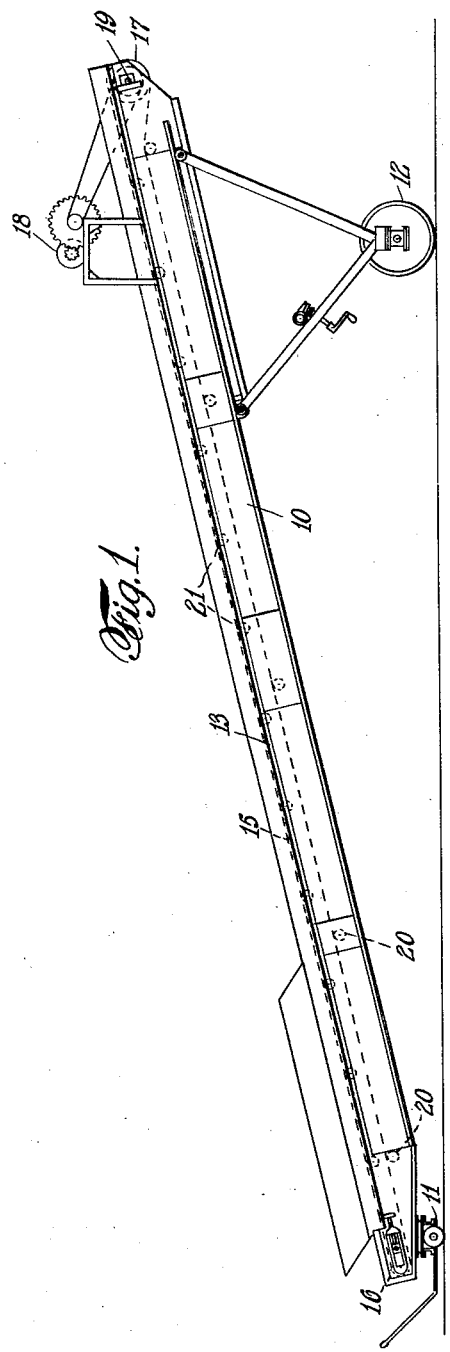
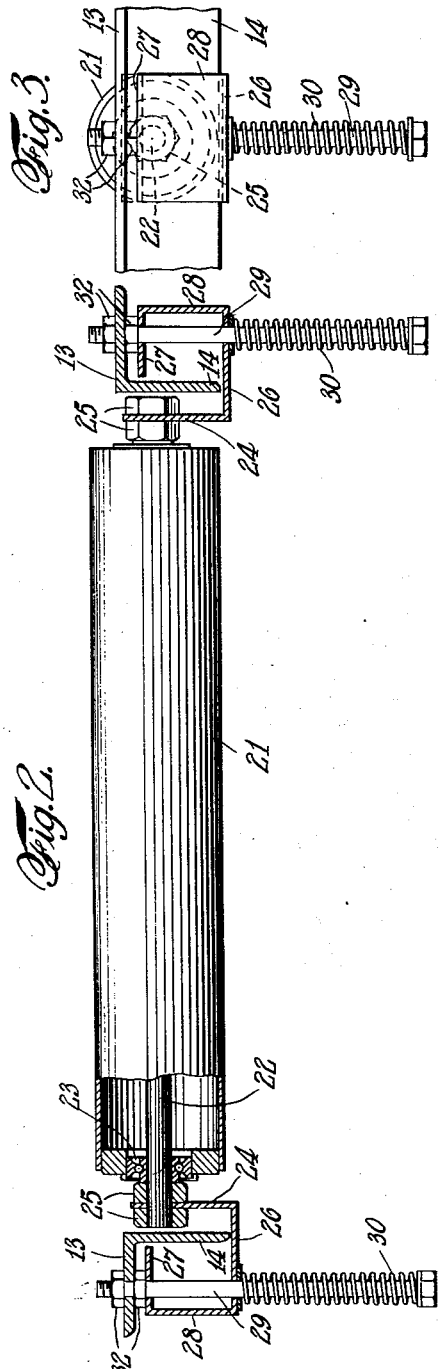
INVENTOR
Raymond C. Haiss
BY
Williams & Moss
ATTORNEYS Patented Oct. 14, 1930

1,778,526

UNITED STATES PATENT OFFICE

RAYMOND C. HAISS, OF NEW YORK, N. Y., ASSIGNOR TO GEORGE HAISS MANUFACTURING CO. INC., OF NEW YORK, N. Y., A CORPORATION OF NEW YORK

CONVEYER

Application filed August 31, 1927. Serial No. 216,529.

This invention relates to conveyers, and is herein shown embodied in a conveyer of the portable type particularly adapted for such work as the handling of bricks or other material.

In such work, bricks or other materials are loaded on the conveyer by workmen stationed at intervals along each side of the machine, and the material is often dropped on to the conveyer in such quantities and with such force as to submit the apparatus to severe and often damaging shocks.

The general object of the present invention is to provide a new and improved construction of conveyer which will resist the hard treatment above mentioned better than conveyers heretofore known.

Other objects and advantages of the invention will become apparent from the following description, taken in connection with the accompanying drawings in which, Fig. 1 is a side elevation of the machine embodying this invention; Fig. 2 is a sectional view showing in detail the yieldable bearings for one of the supporting rollers; and Fig. 3 is a side elevation of one of the yieldable bearings, as viewed from the right in Fig. 2.

Referring to the drawings, the numeral 10 indicates an inclined conveyer frame, suitably supported at opposite ends upon trucks 11 and 12, and including a pair of side frame members 13 having on their adjacent sides depending flanges 14 between which a conveyer belt 15 is adapted to operate. This conveyer belt 15 which is preferably of the wire mesh type and possessing considerable elasticity, is carried by suitable pulleys 16 and 17 arranged at opposite ends of the frame 10, the pulley 17 being driven from a suitable source of power, such as an electric motor 18, operatively connected to the shaft 19 upon which the pulley 17 is mounted.

The lower reach of the conveyer belt 15 may be supported at intervals by rigidly mounted supporting rollers 20; but the upper or load carrying reach of the conveyer belt is supported by a plurality of supporting rollers 21 yieldably mounted as hereinafter described and arranged at intervals beneath the belt and adapted to relieve it of damaging shocks, when the material being loaded is heavy and is dropped on to the conveyer.

The rollers 21 are preferably hollow cylinders and are mounted upon their respective shafts 22 by ball bearings 23. The shafts 22 pass through and are secured to the upwardly projecting arms 24 of vertically movable brackets by nuts 25, as shown most clearly in Fig. 2. These vertically movable brackets which may be of heavy sheet metal, are each formed with a pair of parallel bearing plates 26 and 27, connected together by a vertical side member 28, the ends of the bearing plates 27 being spaced a sufficient distance from the upwardly projecting arms 24 to accommodate the downwardly projecting flanges of the frame side members 13.

The brackets are supported from the side frame 13 by depending guide rods 29 which pass freely through openings formed in the bearing plates 26 and 27. The brackets are yieldingly supported upon the guide rods 29 by compression springs 30, carried by the guide rods and confined between the bearing plates 26 and the headed lower ends of the respective bearing rods 29, the upper ends of said rods being rigidly secured to the side member 13 by nuts 32 threaded on said rods.

As the bearing plates 26 and 27 are spaced from each other, the brackets are prevented from tilting with respect to their respective guide rods, and since the upwardly projecting arms 24 of each pair of brackets are tied together by the shafts 22, the brackets are held against rotative displacement with respect to the guide rods upon which they are mounted. Moreover, as the axes of the rollers are located between the depending flanges 14, any possible longitudinal movement of said roller is thus limited.

By thus yieldably mounting the supporting rollers 21, over which the upper reach of the conveyer belt 15 passes, any undue loading shocks, resulting from dropping material on to the conveyer in excessive quantities and with excessive force, are absorbed, thus relieving the conveyer belt and the supporting rollers therefor of excessive strains, stresses and impacts, with the result that the life and usefulness of the machine is greatly extended.

What I claim is:

1. A conveyer having side frame members, pulleys supported thereby, an endless conveyer belt running on said pulleys and adapted to operate intermediate said frame members, a plurality of depending guide rods rigidly secured to each of said frame members, springs carried by said guide rods, vertically movable brackets carried by and slidable upon said guide rods and yieldably supported thereon by said springs, each of such brackets including horizontally disposed separated bearing plates connected by a side member and having openings therein through which one of said guide rods freely passes, and a plurality of supporting rollers supported at each end by one of said brackets and arranged beneath the load supporting reach of said conveyer belt at intervals.

2. A conveyer having side frame members, an endless conveyer belt adapted to operate intermediate said frame members, a plurality of depending guide rods carried by said frame members, a plurality of brackets each having upwardly projecting arms and horizontally disposed separated bearing plates connected by a side member, said bearing plates being slidably mounted upon said guide rods, springs carried by said guide rods and adapted to yieldably support said bracket, and a plurality of supporting rollers carried by said arms and arranged beneath and in contact with the load supporting reach of said conveyer belt.

3. A conveyer having side frame members provided on their adjacent sides with depending flanges, an endless conveyer belt adapted to operate intermediate said frame members, a plurality of supporting rollers arranged beneath and in contact with the load supporting reach of said conveyer belt, the axis of said rollers being located between the depending flanges of said frame members whereby the longitudinal movement of said rollers is limited, a plurality of depending guide rods carried by said frame members, a plurality of brackets each mounted on one of said guide rods and having an upwardly projecting arm extending adjacent the depending flange of the side frame member upon which its guide rod is carried, a spring carried by each guide rod and adapted to yieldably support the bracket thereon, and means for securing each of said rollers at opposite ends to one of said brackets.

In testimony whereof, I have affixed my signature to this specification.

RAYMOND C. HAISS.